US012494515B1

(12) United States Patent
Wu et al.

(10) Patent No.: US 12,494,515 B1
(45) Date of Patent: Dec. 9, 2025

(54) LITHIUM-ION BATTERY

(71) Applicant: ZHUHAI COSMX BATTERY CO., LTD., Zhuhai (CN)

(72) Inventors: Siyong Wu, Zhuhai (CN); Changan Zeng, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

(21) Appl. No.: 19/182,980

(22) Filed: Apr. 18, 2025

(30) Foreign Application Priority Data

Nov. 22, 2024 (CN) .......................... 202411692498.2

(51) Int. Cl.
| | |
|---|---|
| *H01M 10/0525* | (2010.01) |
| *H01M 4/36* | (2006.01) |
| *H01M 4/587* | (2010.01) |
| *H01M 4/66* | (2006.01) |
| *H01M 10/0569* | (2010.01) |
| *H01M 10/42* | (2006.01) |
| *H01M 4/02* | (2006.01) |

(52) U.S. Cl.
CPC ....... *H01M 10/4235* (2013.01); *H01M 4/366* (2013.01); *H01M 4/587* (2013.01); *H01M 4/661* (2013.01); *H01M 4/667* (2013.01); *H01M 4/668* (2013.01); *H01M 10/0525* (2013.01); *H01M 10/0569* (2013.01); *H01M 2004/021* (2013.01); *H01M 2004/027* (2013.01); *H01M 2300/0034* (2013.01); *H01M 2300/0042* (2013.01)

(58) Field of Classification Search
None
See application file for complete search history.

(56) References Cited

U.S. PATENT DOCUMENTS

| | | | | |
|---|---|---|---|---|
| 5,665,491 | A * | 9/1997 | Tomiyama | ........ H01M 10/0525 |
| | | | | 429/218.1 |
| 2004/0229128 | A1* | 11/2004 | Noh | ................... H01M 10/0569 |
| | | | | 429/231.95 |
| 2009/0081532 | A1* | 3/2009 | Kaplin | ................ H01M 50/107 |
| | | | | 429/185 |
| 2013/0230770 | A1* | 9/2013 | Oya | .................... H01M 50/434 |
| | | | | 429/188 |

* cited by examiner

*Primary Examiner* — Carlos Barcena
(74) *Attorney, Agent, or Firm* — Westbridge IP LLC (57) ABSTRACT

A lithium-ion battery includes an electrolyte, a negative electrode plate and a positive electrode plate. The electrolyte includes a fluorinated solvent; and with a content of the fluorinated solvent being f wt % based on a total weight of the electrolyte, and a ratio of a width of the negative electrode plate to a width of the positive electrode plate being g, the lithium-ion battery satisfies a following relation: $2 \leq f/g \leq 30$.

17 Claims, 2 Drawing Sheets

LITHIUM-ION BATTERY

CROSS-REFERENCE TO RELATED APPLICATIONS

The application claims priority to Chinese Patent Application No. 202411692498.2, filed on Nov. 22, 2024, which is hereby incorporated by reference in its entirety.

TECHNICAL FIELD

The present disclosure relates to the technical field of batteries, and in particular relates to a lithium-ion battery.

BACKGROUND

In recent years, lithium-ion batteries have made significant advancements in energy density, safety, charging speed, cycle life, and other aspects, providing better support and assurance for their widespread application in various scenarios. However, lithium plating in lithium-ion batteries adversely affects the cycling and safety performance of the batteries, hindering the further development of lithium-ion batteries.

SUMMARY

Lithium plating in a lithium-ion battery can be mitigated by adding a functionalized solvent to the electrolyte. The functionalized solvent has a specific functional group and thus can improve the safety and cycling performance of the battery. For example, adding a fluorinated solvent to an organic solvent can improve both the solubility of lithium salts in the organic solvent and the stability of the electrolyte, thus mitigating lithium plating in the battery and improving the safety and cycling performance of the battery. However, burrs can form at the edge of a negative electrode plate after slitting, which will increase the risk of short circuits in a battery, affecting the safety and cycling performance of the battery.

In order to overcome the aforementioned technical problems in the prior art, the present disclosure provides a lithium-ion battery. For the lithium-ion battery of the present disclosure, by controlling the relationship between the weight-based content of the fluorinated solvent in the electrolyte and the ratio of the widths of the positive and negative electrode plates, a Life-rich SEI film having a relatively small thickness and a relatively high toughness can be formed by the fluorinated solvent on the surfaces of the positive and negative electrodes and at the edge of the negative electrode plate, which not only can reduce the risk of short circuits caused by burrs at the edge of the negative electrode plate, but also can increase the diffusion speed of lithium ions in the electrolyte and mitigate lithium plating, thereby improving the safety performance and cycling stability of the battery.

The present disclosure provides a lithium-ion battery, includes an electrolyte, a negative electrode plate and a positive electrode plate, wherein the electrolyte comprises a fluorinated solvent; and with a content of the fluorinated solvent being f wt % based on the total weight of the electrolyte, and a ratio of a width of the negative electrode plate to a width of the positive electrode plate being g, the lithium-ion battery satisfies a following relation: $2 \leq f/g \leq 30$.

With the technical solution described above, the present disclosure, as compared with the prior art, has at least the following advantages.

For the lithium-ion battery of the present disclosure, by controlling the relationship between the weight-based content of the fluorinated solvent in the electrolyte and the ratio of the widths of the positive and negative electrode plates, the stability of the interfaces between the positive and negative electrode plates and the electrolyte can be improved, reducing the concentration polarization and electrochemical polarization of the electrolyte during lithium intercalation/deintercalation; moreover, an SEI film having a relatively high toughness can especially be formed around burrs on the negative electrode plate, making the current in the burr area of the negative electrode plate more uniform, reducing the risk of short circuits caused by burrs at the edge of the negative electrode plate, and improving the cycling and safety performance of the battery. In addition, during cycling, the fluorinated solvent in the electrolyte can repair the SEI film in time, enabling the battery to maintain high cycling performance, increasing the transport rate of lithium ions in the electrolyte, and mitigating lithium plating.

Other features and advantages of the present disclosure will be described in detail hereinbelow.

The endpoints of ranges and any values disclosed herein are not limited to the exact ranges or values; instead, these ranges or values should be understood to include values close to these ranges or values. For the numerical ranges, one or more new numerical ranges can be obtained from the combination of the end values of different ranges, the combination of the end values of different ranges with individual point values, and the combination of individual point values, and these numerical ranges should be considered as being specifically disclosed herein.

DETAILED DESCRIPTIONS OF THE EMBODIMENTS

The specific embodiments of the present disclosure are described in detail below. It should be understood that the specific embodiments described herein are merely used to illustrate and explain the present disclosure, but are not intended to limit the present disclosure. In the present disclosure, unless otherwise specified, all the numerical ranges are inclusive of the endpoints.

It should be noted that the numerical representations of "first", "second", etc., in the present disclosure, are merely used to distinguish different substances or modes of use rather than indicating an order.

The present disclosure provides a lithium-ion battery, includes an electrolyte, a negative electrode plate and a positive electrode plate, wherein the electrolyte comprises a fluorinated solvent; and with a content of the fluorinated solvent being f wt % based on a total weight of the electrolyte, and a ratio of a width of the negative electrode plate to a width of the positive electrode plate being g, the lithium-ion battery satisfies a following relation: $2 \leq f/g \leq 30$.

Figure 1:
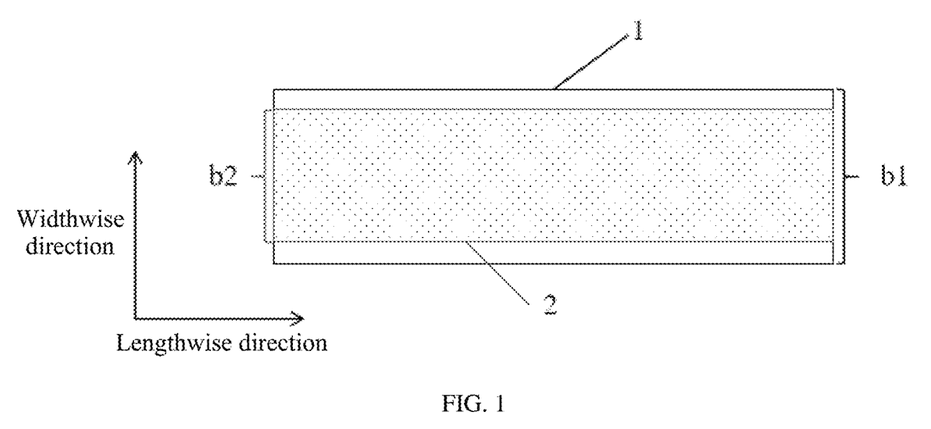
FIG. 1 shows a schematic diagram of stacked negative and positive electrode plates of the present disclosure.

FIG. 1 shows a schematic diagram of stacked negative and positive electrode plates. In order to illustrate the relative relationship between the widths of the negative and positive electrode plates, the separator is not shown in FIG. 1. However, the separator actually exists in the lithium-ion battery, which can separate the positive electrode plate from the negative electrode plate. As shown in FIG. 1, the width b1 of the negative electrode plate 1 is greater than the width b2 of the positive electrode plate 2, and the ratio of the width of the negative electrode plate to the width of the positive electrode plate is g=b2/b1. In the present disclosure, the width is the length in the width direction.

The lithium-ion battery of the present disclosure may be a lithium-ion battery with a jelly-roll structure or a lithium-ion battery with a stacked structure. For the lithium-ion battery with a jelly-roll structure, before winding, positive and negative electrode plates can be stacked as shown in FIG. 1 and then wound to form a jelly roll, where a separator is provided between the positive and negative electrode plates, which can separate the positive electrode plate from the negative electrode plate. For the lithium-ion battery having a stacked structure, positive and negative electrode plates can also be stacked as shown in FIG. 1, and the positive and negative electrode plates as shown in FIG. 1 are stacked repeatedly to form a stacked cell, where separators are provided between the positive and negative electrode plates, which can separate the positive electrode plates from the negative electrode plates.

In the present disclosure, the electrolyte comprises a fluorinated solvent, which forms a solvation sheath around lithium ions upon first discharge. In the sheath, the fluorinated solvent has a high anion concentration, which increases the LUMO energy level of anions, enabling an SEI film to be rich in LiF. The LiF-rich SEI film has a higher Young's modulus and more homogencous lithium ion flux, making lithium dendrites more likely to undergo planar growth. Thus, the interfaces between the electrolyte and the positive and negative electrode plates can be more stable, and the concentration polarization of the electrolyte and the electrochemical polarization during lithium intercalation/deintercalation can be mitigated.

By controlling the relationship between the weight-based content of the fluorinated solvent in the electrolyte and the ratio of the widths of positive and negative electrode plates, it ensures that a LiF-rich SEI film can be formed by the fluorinated solvent on the burrs at the edge of the negative electrode plate. The SEI film is relatively thin and has a high toughness and low impedance, and thus can promote the diffusion and transport of ions, mitigating lithium plating on the interface between the negative electrode plate and the electrolyte. Moreover, when a specific relationship is met, it enables the SEI film to be constantly repaired during cycling and ensures that the SEI film near the burrs on the negative electrode plate has high stability, such that the surface of the negative electrode plate is prevented from localized polarization caused by non-uniform current in the burr area of the negative electrode plate, the risk of short circuits caused by the burrs at the edge of the negative electrode plate is reduced, and the transport rate of lithium ions in the electrolyte is also increased, thereby enabling the battery to maintain long cycling performance and high safety performance.

The lithium-ion battery may satisfy the following relation: $2 \leq f/g \leq 30$ (e.g., 2, 5, 8, 10, 12, 15, 18, 20, 22, 25, 28 or 30). When $f/g<2$, the content of the fluorinated solvent is low, or the ratio of the width of the negative electrode plate to the width of the positive electrode plate is too high. In the case where the content of the fluorinated solvent in the electrolyte is excessively low, a LiF-rich SEI film cannot be formed on the surfaces of the positive and negative electrodes, and the SEI film cannot be repaired in time during cycling, such that polarization and short circuits caused by burrs on the negative electrode plate cannot be effectively mitigated. Moreover, an excessively high ratio of the width of the negative electrode plate to the width of the positive electrode plate will result in decreased effective surface area of the electrodes and more burrs on the negative electrode, greatly increasing micro-short circuits during the process of cycling. When $f/g>30$, the content of the fluorinated solvent is high, or the ratio of the width of the negative electrode plate to the width of the positive electrode plate is too low. An excessively high content of the fluorinated solvent leads to an increase in the viscosity of the electrolyte, increasing the risk of lithium plating of the battery. An excessively low ratio of the width of the negative electrode plate to the width of the positive electrode plate enables the negative electrode plate to have weaker lithium intercalation capacity than the positive electrode plate. Moreover, a high content of the fluorinated solvent will further slow down the intercalation of lithium ions into the negative electrode plate, making the lithium-ion intercalation speed of the negative electrode plate slower.

In the present disclosure, by controlling the relationship between the weight-based content of the fluorinated solvent in the electrolyte and the ratio of the widths of positive and negative electrode plates, it enables the battery to have the advantages of high safety performance and stable cycling performance as compared with those in the prior art. To further improve the effect, one or more technical features may be further optimized.

In an example, the lithium-ion battery satisfies the following relation: $6 \leq f/g \leq 15$.

In an example, 3 wt %≤f wt %≤30 wt % (e.g., 3 wt %, 5 wt %, 10 wt %, 15 wt %, 20 wt %, 25 wt %, or 30 wt %). With the weight-based content of the fluorinated solvent in the electrolyte being controlled within the ranges above, the electrolyte can have a moderate viscosity, and the transport rate of lithium ions in the electrolyte, the solubility of a lithium salt in the electrolyte, and the conductivity of the electrolyte can be increased, improving the cycling stability of the battery.

In an example, 5 wt %≤f wt %≤20 wt %.

In an example, the fluorinated solvent includes one or more of a fluorocarbonate, a fluorocarboxylate, a fluoroether, a fluorobenzene, a fluorophosphate and a fluoroolefin. The fluorinated solvent has a high dielectric constant, which is conducive to the dissolution and dissociation of lithium salts, resulting in improved cycling performance of the battery. In addition, the fluorinated solvent can also form a protective film on the surface of the positive electrode current collector, which inhibits the corrosion of the positive electrode current collector (aluminum foil).

In an example, the number of fluorine substitutions of the fluorinated solvent is less than or equal to 2 (e.g., 1 or 2). When the number of fluorine substitutions of the fluorinated solvent is higher than 2, the viscosity of the electrolyte increases, leading to easy lithium plating in the electrolyte; moreover, the structure of the fluorinated solvent is unstable, and during the process of cycling, the fluorine element in the fluorinated solvent is prone to bond breaking to form HF, which will corrode the positive electrode plate. Therefore, it is necessary to control the number of fluorine substitutions of the fluorinated solvent to be less than or equal to 2.

In an example, the fluorocarbonate includes monofluoroethylene carbonate and/or monofluoroethyl methyl carbonate.

In an example, the fluorocarboxylate includes one or more of monofluoroethyl acetate, difluorodimethyl acetate, difluoroethyl acetate (DFEA), and difluorovinyl acetate.

In an example, the fluoroether includes one or more of 1,1,2,2-tetrafluoroethyl-2,2,3,3-tetrafluoropropyl ether, 2,2-dimethoxy-4-(trifluoromethyl)-1,3-dioxolane ether (DTDL) and octafluoropentyl-tetrafluoroethyl ether.

In an example, the fluorobenzene includes one or more of monofluorobenzene and 1,2-difluorobenzene.

In an example, the fluorophosphate includes one or more of tris(2,2,2-trifluoroethyl)phosphate and bis(2,2,2-trifluoroethyl)ethylphosphate.

In an example, the fluoroolefin includes one or more of 1,2-difluoroethylene, monofluoroethylene and monofluoropropene.

In an example, $1.01 \leq g \leq 1.08$ (e.g., 1.01, 1.02, 1.03, 1.04, 1.05, 1.06, 1.07, or 1.08). By controlling the ratio of the width of the negative electrode plate to the width of the positive electrode plate, the effective surface area of the electrodes, the utilizable capacity of the electrode active materials, and thus the energy density of the battery can be improved.

In an example, $1.03 \leq g \leq 1.06$.

In an example, the ratio n of the area of the negative electrode plate to the area of the positive electrode plate ranges from 1.01:1 to 1.12:1 (e.g., 1.01, 1.02, 1.03, 1.04, 1.05, 1.06, 1.07, 1.08, 1.09, 1.1, 1.11 or 1.12). By controlling the ratio of the area of the negative electrode plate to the area of the positive electrode plate, the effective surface area of the electrodes, the utilizable capacity of the electrode active materials, and thus the energy density of the battery can be improved.

In an example, n ranges from 1.03:1 to 1.08:1.

In an example, $1.01 \leq g \leq 1.08$, and n ranges from 1.01:1 to 1.12:1. The values of g and n may be the same or different. Same g and n values indicate that the ratio of the width of the negative electrode plate to the width of the positive electrode plate is the same as the ratio of the area of the negative electrode plate to the area of the positive electrode plate, meaning the same lengths of the positive and negative electrode plates; and different g and n values indicate that the ratio of the width of the negative electrode plate to the width of the positive electrode plate is different from the ratio of the area of the negative electrode plate to the area of the positive electrode plate, meaning different lengths of the positive and negative electrode plates.

In an example, $1.03 \leq g \leq 1.06$, and n ranges from 1.03:1 to 1.08:1.

Figure 2:
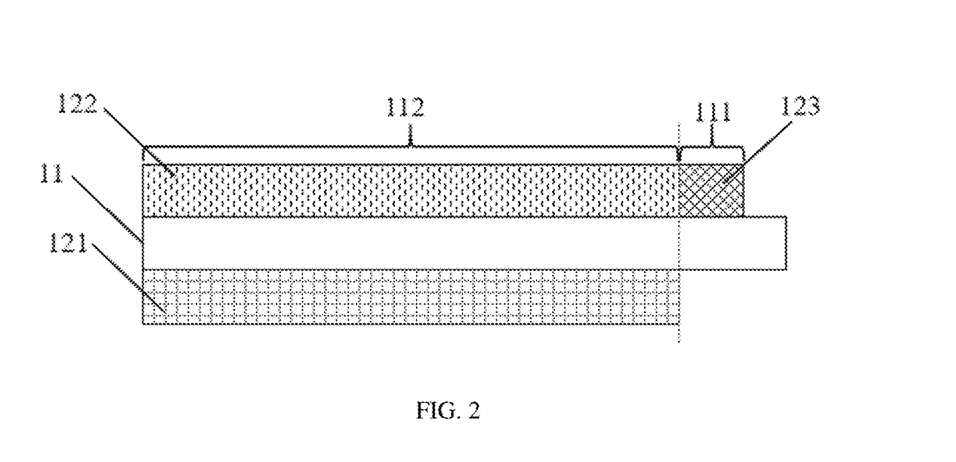
FIG. 2 shows a structural schematic diagram of the negative electrode plate of the present disclosure.

As shown in FIG. 2, the negative electrode plate 1 comprises a negative electrode current collector 11 and a negative electrode active material layer, wherein the negative electrode current collector 11 comprises a single-sided zone 111 and a double-sided zone 112; the negative electrode active material layer comprises a first negative electrode active material layer 121, a second negative electrode active material layer 122 and a third negative electrode active material layer 123; in the single-sided zone 111, the third negative electrode active material layer 123 is provided on the surface of one side of the negative electrode current collector; and in the double-sided zone 112, the first negative electrode active material layer 121 and the second negative electrode active material layer 122 are provided on the surfaces of both sides of the negative electrode current collector 11, respectively.

When the lithium-ion battery is one with a jelly-roll structure, the single-sided zone is positioned at the tail end of the jelly-roll structure.

In an example, with the thickness of the third negative electrode active material layer in the single-sided zone being h, in µm, the lithium-ion battery satisfies the following relation: $0.04 \leq f/h \leq 0.9$ (e.g., 0.04, 0.05, 0.08, 0.1, 0.2, 0.3, 0.4, 0.5, 0.6, 0.7, 0.8 or 0.9).

In an example, with the thickness of the third negative electrode active material layer in the single-sided zone being h, in µm, the lithium-ion battery satisfies the following relation: $0.1 \leq f/h \leq 0.7$ (e.g., 0.1, 0.2, 0.3, 0.4, 0.5, 0.6 or 0.7).

In the single-sided zone of the negative electrode plate, since only one side of the negative electrode current collector is coated with a negative electrode active material layer, the current density is high, which can easily cause localized overheating of the negative electrode plate, exacerbating lithium plating on the surface of the negative electrode plate. The inventor has found during the research that a LiF-rich SEI film having a relatively low impedance can be formed on the surface of the single-sided zone by controlling the relationship between the weight-based content of the fluorinated solvent in the electrolyte and the thickness of the third negative electrode active material layer in the single-sided zone, alleviating lithium plating on the surface of the negative electrode plate caused by localized overheating; furthermore, the fluorinated solvent allows for fast desolvation of lithium ions and can accelerate the intercalation and deintercalation of lithium ions, thereby avoiding the deposition of a transition metal and the side reaction of decomposition of the electrolyte.

In an example, the lithium-ion battery satisfies the following relation: $0.23 \leq f/h \leq 0.5$.

In an example, 30 µm≤h µm≤75 µm. Controlling h within the range above can avoid the difficulty of lithium intercalation/deintercalation on the surface of the negative electrode plate due to excessive thickness. In addition, a moderate thickness enables the battery to maintain both high performance and a high energy density.

In an example, 40 µm≤h µm≤68 µm.

In an example, the second negative electrode active material layer and the third negative electrode active material layer are provided on the same side of the negative electrode current collector, the thickness of the first negative electrode active material layer is the same as or different from the thickness of the second negative electrode active material layer, and the ratio of the thickness of the first negative electrode active material layer to the thickness of the third negative electrode active material layer is 1:(0.8-0.99). Controlling the ratio of the thickness of the first negative electrode active material layer to the thickness of the third negative electrode active material layer enables the overall thickness of the negative electrode active material layers on the negative electrode plate to be kept in a suitable range, while the third negative electrode active material layer is allowed to have a relatively small thickness. This helps to shorten the transport paths of electrons and ions, improves the electronic and ionic conductivity of the battery, and further reduces the internal impedance of the battery and mitigates lithium plating, thereby improving the charge-discharge efficiency and cycling performance of the battery.

In an example, the ratio of the thickness of the first negative electrode active material layer to the thickness of the third negative electrode active material layer ranges from 1:0.86 to 1:0.96.

In an example, the components of the first, second and third negative electrode active material layers, and the weight-based contents thereof may be the same or different.

In an example, the components of the second and third negative electrode active material layers and the weight-based contents thereof are the same.

In an example, the components of the first and second negative electrode active material layers and the weight-based contents thereof are different.

In an example, the negative electrode active material layer comprises a negative electrode active material, which includes a carbon-based material and/or a silicon-based material.

In an example, the carbon-based material includes at least one of natural graphite, artificial graphite, mesocarbon microbeads, soft carbon and hard carbon.

In an example, the silicon-based material may include at least one of silicon, a silicon-oxygen material, a silicon-carbon material and a silicon alloy.

In an example, the negative electrode active material layer comprises a negative electrode conductive agent and a negative electrode binder.

In an example, the negative electrode conductive agent includes at least one of conductive carbon black (Super P), acetylene black, Ketjen black, conductive graphite, conductive carbon fibers, carbon nanotubes, and a metal powder.

In an example, the negative electrode binder includes at least one of styrene-butadiene rubber, sodium carboxymethyl cellulose, polyacrylic acid, polyvinyl alcohol, and polyvinylidene fluoride.

In an example, the weight-based content of the negative electrode active material is 96 wt %-98 wt % (e.g., 96 wt %, 96.5 wt %, 97 wt %, 97.5 wt %, or 98 wt %), the weight-based content of the negative electrode conductive agent is 0.5 wt %-2 wt % (e.g., 0.5 wt %, 1 wt %, 1.5 wt %, or 2 wt %), and the weight-based content of the negative electrode binder is 1 wt %-2 wt % (e.g., 1 wt %, 1.2 wt %, 1.5 wt %, 1.8 wt %, or 2 wt %), based on the total weight of the negative electrode active material layer.

In an example, the negative electrode current collector comprises a polymer layer and copper foil layers on both sides of the polymer layer, and the polymer layer comprises PP and/or PE.

Figure 3:
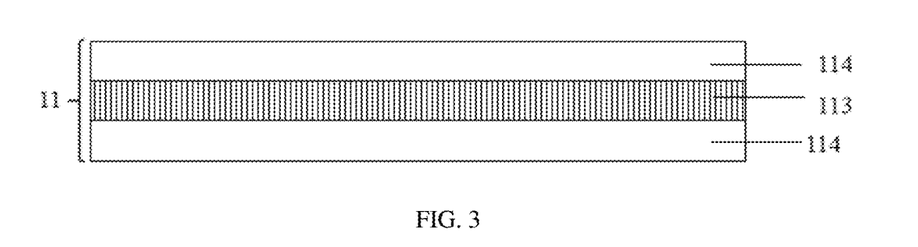
FIG. 3 shows a structural schematic diagram of the positive electrode current collector of the present disclosure.

In order to further improve the safety of the battery, a composite current collector is used as the negative electrode current collector of the present disclosure. As shown in FIG. 3, the negative electrode current collector 11 comprises a polymer layer 113 and copper foil layers 114 on both sides of the polymer layer.

In an example, the ingredient of the polymer layer includes PP and/or PE.

The study has found that the stronger the polarity of a solvent in the electrolyte, the more severe the corrosion of the copper foil. However, the electrolyte of the present disclosure comprises a fluorinated solvent, a weakly polar substance, which can form a protective film on the surface of copper foil after a passivation reaction. The protective film can improve the stability of the copper foil in an electrolyte environment and further reduce the corrosion of the negative electrode current collector by the electrolyte. That is, with the synergistic effects of the negative electrode composite current collector and the fluorinated solvent in the electrolyte, the corrosion of the negative electrode current collector by the electrolyte can be further reduced, thus improving the corrosion resistance of the negative electrode current collector.

In an example, the copper foil layers are copper foils.

In an example, a thickness of the copper foil layer ranges from 0.3 μm to 1.5 μm (e.g., 0.3 μm, 0.5 μm, 0.8 μm, 1 μm, 1.3 μm, or 1.5 μm). The thickness of the copper foil layer refers to a one-sided thickness. The surfaces of both sides of the polymer layer are provided with a copper foil layer, and the thickness of the copper foil layers on each side is the same. Therefore, the thickness of the copper foil layer is considered to be the thickness of the copper foil layer on either side.

In an example, a thickness of the polymer layer ranges from 4 μm to 8 μm (e.g., 4 μm, 5 μm, 6 μm, 7 μm, or 8 μm).

In an example, the thickness t1 of the copper foil layer ranges from 0.3 μm to 1.5 μm, and the thickness of the polymer layer ranges from 4 μm to 8 μm. With the thicknesses of the copper foil layer and the polymer layer being controlled within the ranges above, the copper foil layers can be allowed to be relatively thin to accelerate the transport rate of electrons, and the polymer layer in the middle position has such a moderate thickness that it can enhance the mechanical strength of the negative electrode current collector and improve the structural stability of the battery. In addition, the polymer layer has excellent corrosion resistance and high-temperature resistance and can still maintain stable performance under extreme operating conditions. Compared with conventional current collectors such as a current collector of copper foil only, the negative electrode current collector of the present disclosure is thinner, has better electrical conductivity, better heat dissipation capability and a moderate weight, and can improve the weight-based energy density of the battery.

In an example, the lithium-ion battery includes a negative electrode tab, and with the area of the negative electrode tab being s, in mm$^2$, the lithium-ion battery satisfies the following relation: $0.1 \leq f/s \leq 3$ (e.g., 0.1, 0.5, 1, 1.5, 2, 2.5 or 3).

Figure 4:
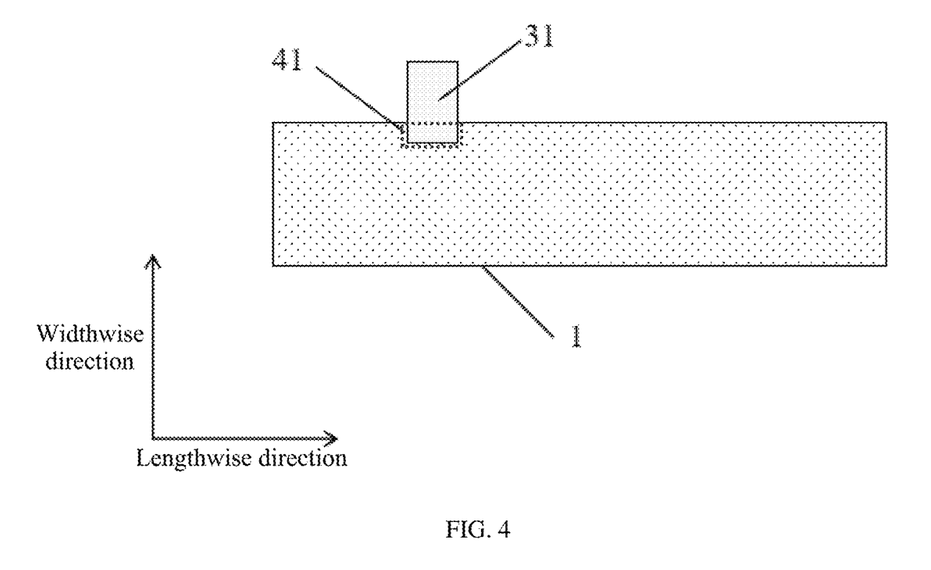
FIG. 4 shows a schematic diagram of a tab in an example of the present disclosure.

The areas of the tab is the area where the tab overlaps with an electrode plate. In the present disclosure, the lithium-ion battery includes a negative electrode tab, and the area s of the tab is the area of the negative electrode tab. As shown in FIG. 4, the area of portion 41 where the negative electrode tab 31 of the negative electrode plate 1 overlaps with the negative electrode plate 1 is the area s of the tab.

During prolonged use, the tab is exposed to an electrolyte environment that can lead to electrochemical corrosion. The corrosion will result in a rough surface of the tab, which increases the resistance and negatively impacts the performance and efficiency of the battery. Currently, the purpose of corrosion protection is achieved by covering a tab with adhesive tape. However, due to current overload at the edge of a tab, a negative electrode plate is subjected to rapid lithium intercalation/deintercalation, causing severe lithium plating at the edge of the tab.

To solve the aforementioned technical problem related to a tab, the present disclosure, by controlling the relationship between the weight-based content of a fluorinated solvent in the electrolyte and the size of a tab, enables the fluorinated solvent to form a protective layer in the vicinity of the negative electrode tab. The protective layer is ion-conductive but electron-insulating and therefore can reduce current overload near the tab, accelerating lithium intercalation/deintercalation and thereby alleviating lithium plating.

When f/s<0.1, the weight-based content of the fluorinated solvent in the electrolyte is low, such that the interfacial film formation at the edge of the tab is unstable at a high voltage, and the protective layer can not be repaired in time when damaged. When f/s>3, the weight-based content of the fluorinated solvent in the electrolyte is too high, resulting in a high viscosity of the electrolyte, such that during high-rate charge/discharge, the transport rate of lithium ions in the electrolyte is significantly slowed down, giving rise to the increased risk of lithium plating on the tab. In addition, the size of the tab is excessively small, such that the resistance at the tab will be increased in the case of an excessively large current transfer density, resulting in localized overheating and thus increasing the risk of battery safety issues.

In an example, the lithium-ion battery satisfies the following relation: 0.4≤f/s≤1.

In an example, 10≤ s≤ 30 (e.g., 10, 15, 20, 25, or 30).

When s>30, the area of the tab is too large, and an increase in the space occupied by the tab leads to an increase in the size of the battery, which is especially problematic for space-constrained battery integration; in addition, a tab with an excessively large area will lead to increased weight and reduced energy density and power density of the battery, and also correspondingly increased costs. However, the area of the tab should not be too small. When s<10, the current carrying capacity is insufficient. As a conduction channel for current, a tab, if too small, may not be able to carry sufficient currents, resulting in an excessively high current density, increasing the resistance at the tab and affecting the charge/discharge performance of a battery. In addition, a tab with a relatively small area will limit the diffusion of heat and the heat dissipation capability, resulting in localized overheating of a battery and accelerating the aging and damage of the battery.

In an example, 15≤s≤25.

In an example, the positive electrode plate includes a positive electrode current collector and a positive electrode active material layer provided on one side or both sides of the positive electrode current collector, wherein the positive electrode active material layer includes a positive electrode active material, a positive electrode conductive agent, and a positive electrode binder.

In an example, the positive electrode active material includes at least one of lithium cobalt oxide, lithium nickel cobalt manganese oxide, lithium nickel cobalt aluminum oxide, lithium nickel cobalt manganese aluminum oxide, lithium manganese oxide, lithium nickel manganese oxide, lithium nickel oxide, lithium iron phosphate, lithium manganese iron phosphate, lithium vanadium phosphate, and lithium-rich manganese.

In an example, the positive electrode conductive agent includes at least one of conductive carbon black (Super P), acetylene black, Ketjen black, conductive graphite, conductive carbon fibers, carbon nanotubes, and a metal powder.

In an example, the positive electrode binder includes at least one of polyvinylidene fluoride (PVDF), sodium carboxymethyl cellulose, styrene-butadiene rubber, polytetrafluoroethylene, and polyethylene oxide.

In an example, the weight-based content of the positive electrode active material is 96 wt %-98.5 wt %, the weight-based content of the positive electrode conductive agent is 0.5 wt %-2 wt %, and the weight-based content of the positive electrode binder is 0.5 wt %-2 wt %, based on the total weight of the positive electrode active material layer.

In an example, the electrolyte further includes a lithium salt, ethylene carbonate (EC), propylene carbonate (PC), an organic solvent and an additive.

In an example, the lithium salt includes one or more of lithium hexafluorophosphate ($LiPF_6$), lithium difluorophosphate ($LiPO_2F_2$), lithium difluoro(oxalato)borate (LiDFOB), lithium bis(fluorosulfonyl)imide (LiTFSI), lithium bis(trifluoromethanesulfonyl)imide, lithium bis(oxyalyl)difluorophosphate, lithium tetrafluoroborate, lithium bis(oxalato)borate, lithium hexafluoroantimonate, lithium hexafluoroarsenate, lithium bis(pentafluoroethanesulfonyl)imide, and lithium tris(trifluoromethanesulfonyl)methide. The lithium salt may affect the basic physical and chemical properties of the electrolyte and is an ingredient in the electrolyte that can significantly affect the characteristics of lithium-ion batteries. Moreover, the lithium salt has the function of conducting lithium ions, which can improve the conductivity of the electrolyte.

The ethylene carbonate (EC) can form an SEI film on the negative electrode plate during the first charge and discharge cycle, thereby improving the efficiency of subsequent intercalation and deintercalation of lithium ions at the negative electrode and reducing the occurrence of side reactions.

The propylene carbonate (PC) has a high dielectric constant and can promote the dissociation of the lithium salt, greatly increasing the conductivity of ions in the electrolyte.

In an example, the organic solvent includes one or more of propyl propionate (PP), ethyl propionate (EP), ethyl butyrate (EB), ethyl acetate (EA), diethyl carbonate (DEC), and ethyl methyl carbonate (EMC).

In an example, the additive includes one or more of 1,3-propanesultone (PS), prop-1-ene-1,3-sultone (PST), vinylene carbonate (VC), vinyl ethylene carbonate (VEC), adiponitrile (ADN), succinonitrile (SN), fluoroethylene carbonate (FEC), and 1,3,6-hexanetricarbonitrile (HTCN). The succinonitrile (SN) and 1,3,6-hexanetricarbonitrile (HTCN) mainly complex with cobalt ions in the positive electrode plate to protect the positive electrode material from dissolution and coming off at a high voltage; and VC and PS preferentially form a film on the surface of the negative electrode plate, making the SEI film firmer.

In an example, the weight-based content of the lithium salt is 10-21 wt %, the weight-based content of the EC is 0-15 wt %, the weight-based content of the PC is 7-15 wt %, the weight-based content of the organic solvent is 30-60 wt %, and the weight-based content of the additive is 15-25 wt %, based on the total weight of the electrolyte.

In an example, the lithium-ion battery is lithium-ion secondary battery.

The present disclosure is described in detail below with the following examples. The examples described in the present disclosure are merely some rather than all of the examples of the present disclosure. Based on the examples of the present disclosure, all other examples that can be obtained by those of ordinary skill in the art without creative efforts shall fall within the scope of protection of the present disclosure.

The following examples are intended to illustrate the lithium-ion battery of the present disclosure.

Example 1

(1) Preparation of Positive Electrode Plate

A positive electrode active material (lithium cobalt oxide), a positive electrode conductive agent (Super P), and a positive electrode binder (polyvinylidene fluoride (PVDF)) in a weight ratio of 98:1.2:0.8 were dispersed in an appropriate amount of N-methylpyrrolidone (NMP) and were then sufficiently stirred to form a uniform positive electrode slurry; the positive electrode slurry was then coated onto the surfaces of both sides of a positive electrode current collector (conventional aluminum foil), followed by drying, rolling, and cutting (cutting to a size of 6.5 cm*120 cm); and after cleaning (cleaning an area of 3*5 mm), a tab adhesive was applied, so as to obtain a positive electrode plate, which had a width of 118 mm and an area of 104,481 $mm^2$.

(2) Preparation of Negative Electrode Plate

A negative electrode active material (graphite), a negative electrode conductive agent (Super P), and a negative electrode binder (1.5 parts by weight of styrene-butadiene rubber (SBR) and 0.5 parts by weight of sodium carboxymethyl cellulose (CMC) as a thickener) in a weight ratio of 97:1:2 were dispersed in an appropriate amount of deionized water and were then sufficiently stirred to form a uniform negative electrode slurry; the negative electrode slurry was then coated onto the surface of a negative electrode current collector (conventional copper foil) to form a negative electrode active material layer, wherein the double-sided zone of the negative electrode current collector is coated with a first negative electrode active material layer having a thickness of 51.2 µm and a second negative electrode active material layer having a thickness of 51.2 µm, respectively, and the surface of one side (the same side as the second negative electrode active material layer) of the single-sided zone of the negative electrode current collector is coated with a third negative electrode active material layer having a thickness of 49.1 µm, followed by drying, rolling, and cutting (cutting to a size of 6.8 cm*120.5 cm); and after cleaning, a tab adhesive was applied, so as to obtain a negative electrode plate.

The negative electrode plate had a width of 123 mm and an area of 109,456 mm$^2$; the ratio of the thickness of the first negative electrode active material layer to the thickness of the third negative electrode active material layer was 1:0.959; and the negative electrode tab had an area of 15 mm$^2$.

(3) Preparation of Electrolyte

Ingredient preparation: a fluorinated solvent: difluoroethyl acetate (DFEA) (with the number of fluorine substitutions of the fluorinated solvent being 2), 12 parts by weight; EC, 10 parts by weight; PC, 10 parts by weight; an organic solvent: PP, 35 parts by weight; a lithium salt: lithium hexafluorophosphate, 15 parts by weight; and additives: PS, 3 parts by weight; FEC, 8 parts by weight; SN, 2 parts by weight; HTCN, 3 parts by weight; and ADN, 2 parts by weight, totaling 18 parts by weight.

In a glove box (H$_2$<0.01 ppm, O$_2$<0.01 ppm, Ar atmosphere), EC/PC/PP/DFEA were mixed until uniform; then a well-dried lithium salt was added thereto and dissolved completely; additives were then added and stirred until uniform; and a desired electrolyte was obtained after passing the moisture and free acid tests.

(4) Separator

A separator consisted of a substrate layer and coatings on both sides of the substrate layer, wherein the ingredient of the substrate layer was PP/PE, the coating on one side of the substrate layer was PVDF, and the coating on the other side of the substrate layer was PMMA.

(5) Preparation of Lithium-Ion Battery

The positive electrode plate of step (1), the separator of step (4), and the negative electrode plate of step (2) were wound to obtain a bare battery that was not filled with an electrolyte; and the bare battery was placed in outer packaging foil, and the electrolyte of step (3) was injected into the dried bare cell, followed by procedures such as vacuum packaging, leaving to stand, formation, shaping, and sorting, so as to obtain a desired lithium-ion battery.

The ratio g of the width of the negative electrode plate to the width of the positive electrode plate was 1.04; the ratio n of the area of the negative electrode plate to the area of the positive electrode plate was 1.05; f/g=12/1.04=11.51; f/h=0.244; and f/s=0.8.

Example 2

This example followed Example 1, except that the negative electrode current collector was a composite current collector including a polymer layer and copper foil layers on both sides of the polymer layer, wherein the polymer layer was PP and had a thickness of 6 µm, and the copper foil layers had a thickness of 1 µm.

Example Group 3

This group of examples was intended to illustrate the effects of varying f/g.

Example 3a

This example followed Example 1, except that the weight-based content f % of the fluorinated solvent in the electrolyte was 5%, and accordingly, f/g=4.8, f/h=0.102, and f/s=0.333.

Example 3b

This example followed Example 1, except that the weight-based content f % of the fluorinated solvent in the electrolyte was 18%, and accordingly, f/g=17.27, f/h=0.367, and f/s=1.2.

Example 3c

This example followed Example 1, except that the weight-based content f % of the fluorinated solvent in the electrolyte was 31%, and accordingly, f/g=29.81, f/h=0.631, and f/s=2.067.

Example 3d

This example followed Example 1, except that the weight-based content f % of the fluorinated solvent in the electrolyte was 3%, and accordingly, f/g=2.88, f/h=0.061, and f/s=0.2.

Example 3e

This example followed Example 1, except that the negative electrode plate had a width of 126.5 mm and an area of 112,571 mm$^2$, the positive electrode plate had a width of 118.2 mm and an area of 104,658 mm$^2$, and correspondingly, g=1.07, n=1.08, and f/g=11.21.

Example 3f

This example followed Example 1, except that the negative electrode plate had a width of 119.5 mm and an area of 106,341 mm$^2$, the positive electrode plate had a width of 118.3 mm and an area of 104,746 mm$^2$, and correspondingly, g=1.01, n=1.02, and f/g=11.88.

Example 3g

This example followed Example 1, except that the negative electrode plate had a width of 130.1 mm and an area of 115,774 mm$^2$, the positive electrode plate had a width of 118.3 mm and an area of 104,746 mm$^2$, and correspondingly, g=1.1, n=1.11, and f/g=10.91.

Example Group 4

This group of examples was intended to illustrate the effects of varying f/h.

Example 4a

This example followed Example 1, except that the thickness h of the third negative electrode active material layer was 41.2 µm, and in order to keep the ratio of the thickness of the first negative electrode active material layer to the thickness of the third negative electrode active material layer substantially constant, the thickness of the first negative electrode active material layer was adaptively adjusted to 43 µm, such that f/h=0.291.

Example 4b

This example followed Example 1, except that the thickness h of the third negative electrode active material layer was 67.4 µm, and in order to keep the ratio of the thickness of the first negative electrode active material layer to the thickness of the third negative electrode active material layer substantially constant, the thickness of the first negative electrode active material layer was adaptively adjusted to 70.3 µm, such that f/h=0.178.

Example 4c

This example followed Example 1, except that the weight-based content of the fluorinated solvent in the electrolyte was 25%, the thickness h of the third negative electrode active material layer was 31.3 µm, and in order to keep the ratio of the thickness of the first negative electrode active material layer to the thickness of the third negative electrode active material layer substantially constant, the thickness of the first negative electrode active material layer was adaptively adjusted to be 32.6 µm, such that f/g=23.98, f/h=0.799, and f/s=1.667.

Example 4d

This example followed Example 1, except that the thickness h of the third negative electrode active material layer was 74.6 µm, and in order to keep the ratio of the thickness of the first negative electrode active material layer to the thickness of the third negative electrode active material layer substantially constant, the thickness of the first negative electrode active material layer was adaptively adjusted to 77.8 µm, such that f/h=0.161.

Example 4e

This example followed Example 1, except that the thickness h of the third negative electrode active material layer was 28.5 µm, and in order to keep the ratio of the thickness of the first negative electrode active material layer to the thickness of the third negative electrode active material layer substantially constant, the thickness of the first negative electrode active material layer was adaptively adjusted to 29.7 µm, such that f/h=0.421.

Example 4f

This example followed Example 1, except that the weight-based content of the fluorinated solvent in the electrolyte was 3%, the thickness h of the third negative electrode active material layer was 78.8 µm, and in order to keep the ratio of the thickness of the first negative electrode active material layer to the thickness of the third negative electrode active material layer substantially constant, the thickness of the first negative electrode active material layer was adaptively adjusted to be 82.2 µm, such that f/g=2.88, f/h=0.038, and f/s=0.2.

Example Group 5

This group of examples was intended to illustrate the effects of varying ratios of the thickness of the first negative electrode active material layer to the thickness of the third negative electrode active material layer.

Example 5a

This example followed Example 1, except that the thickness h of the third negative electrode active material layer was 50.4 µm, such that the ratio of the thickness of the first negative electrode active material layer to the thickness of the third negative electrode active material layer was 1:0.984, and f/h=0.238.

Example 5b

This example followed Example 1, except that the thickness h of the third negative electrode active material layer was 44.3 µm, such that the ratio of the thickness of the first negative electrode active material layer to the thickness of the third negative electrode active material layer was 1:0.865, and f/h=0.271.

Example 5c

This example followed Example 1, except that the thickness h of the third negative electrode active material layer was 41.8 µm, such that the ratio of the thickness of the first negative electrode active material layer to the thickness of the third negative electrode active material layer was 1:0.816, and f/h=0.287.

Example 5d

This example followed Example 1, except that the thickness h of the third negative electrode active material layer was 62.1 µm, such that the ratio of the thickness of the first negative electrode active material layer to the thickness of the third negative electrode active material layer was 1:1.213, and f/h=0.193.

Example 5e

This example followed Example 1, except that the thickness h of the third negative electrode active material layer was 535.7 µm, such that the ratio of the thickness of the first negative electrode active material layer to the thickness of the third negative electrode active material layer was 1:0.697, and f/h=0.336.

Example Group 6

This group of examples was intended to illustrate the effects of varying f/s.

Example 6a

This example followed Example 2, except that the area s of the tab was 10 mm², such that f/s=1.2.

Example 6b

This example followed Example 2, except that the area s of the tab was 8 mm², such that f/s=1.5.

Example 6c

This example followed Example 2, except that the area s of the tab was 40 mm², such that f/s=0.3.

Example 6d

This example followed Example 2, except that the area s of the tab was 30 mm², such that f/s=0.4.

Example 6e

This example followed Example 2, except that the weight-based content of the fluorinated solvent in the electrolyte was 30%, and the area s of the tab was 10 mm², such that f/g=28.78, f/h=0.611, and f/s=3.

Example 6f

This example followed Example 2, except that the weight-based content of the fluorinated solvent in the electrolyte was 30%, and the area s of the tab was 8 mm², such that f/g=28.78, f/h=0.611, and f/s=3.75.

Example 6g

This example followed Example 2, except that the area s of the tab was 25 mm², such that f/s=0.48.

Example Group 7

This group of examples was intended to illustrate the effects of varying fluorinated solvents.

Example 7a

This example followed Example 1, except that the fluorinated solvent was monofluorobenzene (the number of fluorine substitutions of the fluorinated solvent was 1).

Example 7b

This example followed Example 1, except that the fluorinated solvent was octafluoropentyl-tetrafluoroethyl ether (the number of fluorine substitutions of the fluorinated solvent was 12).

Example 7c

This example followed Example 1, except that the fluorinated solvent was 1,1,2,2-tetrafluoroethyl-2,2,3,3-tetrafluoropropyl ether (the number of fluorine substitutions of the fluorinated solvent was 8).

Comparative Example 1

This comparative example followed Example 1, except that the weight-based content of the fluorinated solvent in the electrolyte was 33%, such that f/g=31.73, f/h=0.672, and f/s=0.367.

Comparative Example 2

This comparative example followed Example 1, except that the weight-based content of the fluorinated solvent in the electrolyte was 1.5%, the thickness h of the third negative electrode active material layer was 12 μm, and in order to keep the ratio of the thickness of the first negative electrode active material layer to the thickness of the third negative electrode active material layer substantially constant, the thickness of the first negative electrode active material layer was adaptively adjusted to be 12.5 μm, such that f/g=1.44, f/h=0.125, and f/s=0.05.

Comparative Example 3

This comparative example followed Example 1, except that no fluorinated solvent was added to the electrolyte.

Comparative Example 4

This comparative example followed Example 1, except that the width of the positive electrode plate was the same as the width of the negative electrode plate, and the area of the positive electrode plate was the same as the area of the negative electrode plate.

TEST EXAMPLES

The lithium-ion batteries obtained in the examples and comparative examples were tested as follows:

Cycling Performance Test

At 25° C., a lithium-ion battery was first discharged at 0.2 C to 3 V and then charged at 0.5 C to 4.48 V, and the capacity and thickness of the battery in a full-charge state were recorded; the battery was discharged at 0.2 C to 3 V, then charged at a constant current of 1 C to 4.48 V, then charged at 0.7 C to the upper limit voltage (4.53 V), then charged at a constant voltage of 4.53 V to 0.05 C, and then left to stand for 5 minutes; and subsequently, the battery was discharged at a constant current of 0.7 C to 3 V and then left to stand for 5 minutes. This was a charge-discharge cycle. The battery was charged/discharged in such a way for 1000 T, and during cycling, the performance parameters of the lithium-ion battery were recorded, including the capacity retention, the thickness expansion, and abnormal appearance. After cycling, the battery was disassembled to observe lithium plating.

Capacity retention=1000 T capacity/initial capacity*100%

Thickness expansion %=1000 T full-charge battery thickness/initial thickness*100%

Situation of lithium plating: The post-test battery was charged at 0.5 C to 4.48 V and was then disassembled to observe whether there were off-white dot-like or patchy abnormalities on the top and bottom edges, flat surfaces, and arcs of the negative electrode interface. The situation where no off-white dot-like or patchy abnormality was observed was classified as no lithium plating; the situation where the area of off-white dot-like or patchy abnormalities was less than 10% of the area of the electrode plate was considered as slight lithium plating; and the situation where the area of off-white dot-like or patchy abnormalities was 10% or more of the area of the electrode plate was considered as lithium plating.

Safety Performance Test—External Short Circuit at 25° C.

The battery was fully charged (100% SOC) at 0.5 C, cut off at 0.05 C and left to stand for 10 minutes, and then the voltage, internal resistance and thickness of the battery were measured at 25±5° C. in a full-charge state (100% SOC). A battery cell was left to stand in an environment at 25° C.±5° C. for 30 minutes; the positive and negative electrodes thereof were short-circuited, with a short-circuit resistance ≤50 mΩ; the voltage, and the temperature rise of the battery cell body were monitored; and the test was terminated when the temperature of the battery cell decreased to 20% or less of the peak temperature or when the test time was greater than 24H. A battery exhibiting explosion or fire was considered to have failed the test. 10 battery samples were tested in total, and the test results were presented as "number of passed samples/10." For example, "8/10" means that 8 out of 10 samples passed the test.

The results obtained are recorded in Table 1.

TABLE 1

| | Capacity retention/ % | Thickness expansion/ % | Safety performance pass rate | Situation of lithium plating |
|---|---|---|---|---|
| Example 1 | 83 | 11.7 | 10/10 | No lithium plating |
| Example 2 | 85.4 | 9 | 10/10 | No lithium plating |
| Example 3a | 77 | 15.3 | 10/10 | No lithium plating |
| Example 3b | 77.9 | 14.8 | 10/10 | No lithium plating |
| Example 3c | 76.6 | 15.5 | 10/10 | No lithium plating |
| Example 3d | 75.3 | 18 | 7/10 | Slight lithium plating |
| Example 3e | 81.4 | 13.5 | 10/10 | No lithium plating |
| Example 3f | 80.2 | 13.5 | 10/10 | No lithium plating |
| Example 3g | 79.3 | 15 | 10/10 | Slight lithium plating |
| Example 4a | 82.3 | 11.9 | 10/10 | No lithium plating |
| Example 4b | 78.3 | 14.2 | 10/10 | No lithium plating |
| Example 4c | 74.2 | 16 | 10/10 | No lithium plating |
| Example 4d | 77 | 15.5 | 10/10 | No lithium plating |
| Example 4e | 81 | 12.5 | 10/10 | No lithium plating |
| Example 4f | 74.9 | 18.7 | 10/10 | Slight lithium plating |
| Example 5a | 80.4 | 12.3 | 10/10 | No lithium plating |
| Example 5b | 82.6 | 10.7 | 10/10 | No lithium plating |
| Example 5c | 79.9 | 12.5 | 10/10 | No lithium plating |
| Example 5d | 76.7 | 13.3 | 10/10 | Slight lithium plating |
| Example 5e | 75.1 | 14 | 10/10 | No lithium plating |
| Example 6a | 75.3 | 14.2 | 10/10 | No lithium plating |
| Example 6b | 79.1 | 12.3 | 10/10 | No lithium plating |
| Example 6c | 80.4 | 13.5 | 10/10 | No lithium plating |
| Example 6d | 83.7 | 10.3 | 10/10 | No lithium plating |
| Example 6e | 82.6 | 11.7 | 10/10 | No lithium plating |
| Example 6f | 70.3 | 15.4 | 10/10 | No lithium plating |
| Example 6g | 84.2 | 9.7 | 10/10 | No lithium plating |
| Example 7a | 82.5 | 12.7 | 10/10 | No lithium plating |
| Example 7b | 78.5 | 16.4 | 8/10 | No lithium plating |
| Example 7c | 75.4 | 15.1 | 8/10 | No lithium plating |
| Comparative example 1 | 70.5 | 19 | 5/10 | Lithium plating |
| Comparative example 2 | 67.3 | 23 | 6/10 | Lithium plating |
| Comparative example 3 | 65.1 | 27 | 4/10 | Lithium plating |
| Comparative example 4 | 66.4 | 25 | 5/10 | Lithium plating |

As can be seen from the comparative examples and the examples in Table 1, the lithium-ion batteries of the examples have significantly improved capacity retentions, significantly reduced thickness expansions and significantly increased safety performance pass rates, indicating that the safety performance and cycling stability of the batteries are improved by controlling the relationship between the weight-based content of fluorinated solvents in electrolytes and the ratio of the widths of positive and negative electrode plates.

Preferred embodiments of the present disclosure are described in detail above; however, the present disclosure is not limited thereto. Within the scope of the technical concept of the present disclosure, various simple variations may be made to the technical solution of the present disclosure, including the combinations of technical features in any other suitable manner. Such simple variations and combinations shall also be considered as disclosed in the present disclosure and all fall within the scope of protection of the present disclosure.

What is claimed is:

1. A lithium-ion battery, comprising an electrolyte, a negative electrode plate and a positive electrode plate, wherein the electrolyte comprises a fluorinated solvent; and with a content of fluorinated solvent being f wt % based on a total weight of the electrolyte, and a ratio of a width of the negative electrode plate to a width of the positive electrode plate being g, the lithium-ion battery satisfies a following relation: $2 \leq f/g \leq 30$; the negative electrode plate comprises a negative electrode current collector and a negative electrode active material layer; the negative electrode current collector comprises a single-sided zone and a double-sided zone; the negative electrode active material layer comprises a first negative electrode active material layer, a second negative electrode active material layer, and a third negative electrode active material layer; in the single-sided zone, the third negative electrode active material layer is provided on the surface of one side of the negative electrode current collector; in the double-sided zone, the first negative electrode active material layer and the second negative electrode active material layer are provided on the surfaces of both sides of the negative electrode current collector, respectively; and with the thickness of the third negative electrode active material layer in the single-sided zone being h, in μm, the lithium-ion battery satisfies the following relation: $0.04 \leq f/h \leq 0.9$, and 30 μm $\leq h \leq$ 75 μm.

2. The lithium-ion battery according to claim 1, wherein $1.01 \leq g \leq 1.08$; and/or 3 wt % $\leq$ f wt % $\leq$ 30 wt %.

3. The lithium-ion battery according to claim 1, wherein the lithium-ion battery satisfies the following relation: $6 \leq f/g \leq 15$; and/or $1.03 \leq g \leq 1.06$; and/or 5 wt % $\leq$ f wt % $\leq$ 20 wt %.

4. The lithium-ion battery according to claim 1, wherein the fluorinated solvent comprises one or more of a fluorocarbonate, a fluorocarboxylate, a fluoroether, a fluorobenzene, a fluorophosphate and a fluoroolefin.

5. The lithium-ion battery according to claim 4, wherein the fluorocarbonate comprises monofluoroethylene carbonate and/or monofluoroethyl methyl carbonate; and/or the fluorocarboxylate comprises one or more of monofluoroethyl acetate, difluorodimethyl acetate, difluoroethyl acetate, and difluorovinyl acetate; and/or the fluoroether comprises one or more of 1,1,2,2-tetrafluoroethyl-2,2,3,3-tetrafluoropropyl ether, 2,2-dimethoxy-4-(trifluoromethyl)-1,3-dioxolane ether and octafluoropentyl-tetrafluoroethyl ether; and/or the fluorobenzene comprises one or more of monofluorobenzene and 1,2-difluorobenzene; and/or the fluorophosphate comprises one or more of tris(2,2,2-trifluoroethyl)phosphate and bis(2,2,2-trifluoroethyl) ethylphosphate; and/or the fluoroolefin comprises one or more of 1,2-difluoroethylene, monofluoroethylene and monofluoropropene; and/or a number of fluorine substitutions of the fluorinated solvent is less than or equal to 2.

6. The lithium-ion battery according to claim 1, wherein a ratio n of the area of the negative electrode plate to the area of the positive electrode plate ranges from 1.01:1 to 1.12:1.

7. The lithium-ion battery according to claim 1, wherein n ranges from 1.03:1 to 1.08:1.

8. The lithium-ion battery according to claim 1, wherein the lithium-ion battery satisfies the following relation: $0.1 \leq f/h \leq 0.7$; and/or 40 μm $\leq h \leq$ 68 μm.

9. The lithium-ion battery according to claim 1, wherein the second negative electrode active material layer and the third negative electrode active material layer are provided on the same side of the negative electrode current collector, a ratio of a thickness of the first negative electrode active material layer to a thickness of the third negative electrode active material layer ranges from 1:0.8 to 1:0.99.

10. The lithium-ion battery according to claim 9, wherein the thickness of the first negative electrode active material layer is the same as the thickness of the second negative electrode active material layer.

11. The lithium-ion battery according to claim 1, wherein the negative electrode current collector comprises a polymer layer and copper foil layers on both sides of the polymer layer, and the polymer layer comprises PP and/or PE.

12. The lithium-ion battery according to claim 11, wherein a thickness of the copper foil layer ranges from 0.3 μm to 1.5 μm; and/or
a thickness of the polymer layer ranges from 4 μm to 8 μm.

13. The lithium-ion battery according to claim 1, wherein the active material layer of the negative electrode plate comprises a negative electrode active material, which comprises a carbon-based material and/or a silicon-based material; the carbon-based material comprises at least one of natural graphite, artificial graphite, mesocarbon microbeads, soft carbon and hard carbon; and the silicon-based material comprises at least one of silicon, a silicon-oxygen material, a silicon-carbon material and a silicon alloy.

14. The lithium-ion battery according to claim 1, wherein the lithium-ion battery comprises a negative electrode tab; and with the area of the negative electrode tab being s, in $mm^2$, the lithium-ion battery satisfies the following relation: $0.1 \leq f/s \leq 3$.

15. The lithium-ion battery according to claim 14, wherein $10 \leq s \leq 30$.

16. The lithium-ion battery according to claim 14, wherein the lithium-ion battery satisfies the following relation: $0.4 \leq f/s \leq 1$; and/or $15 \leq s \leq 25$.

17. The lithium-ion battery according to claim 1, wherein the lithium-ion battery is lithium-ion secondary battery.

* * * * *